UNITED STATES PATENT OFFICE.

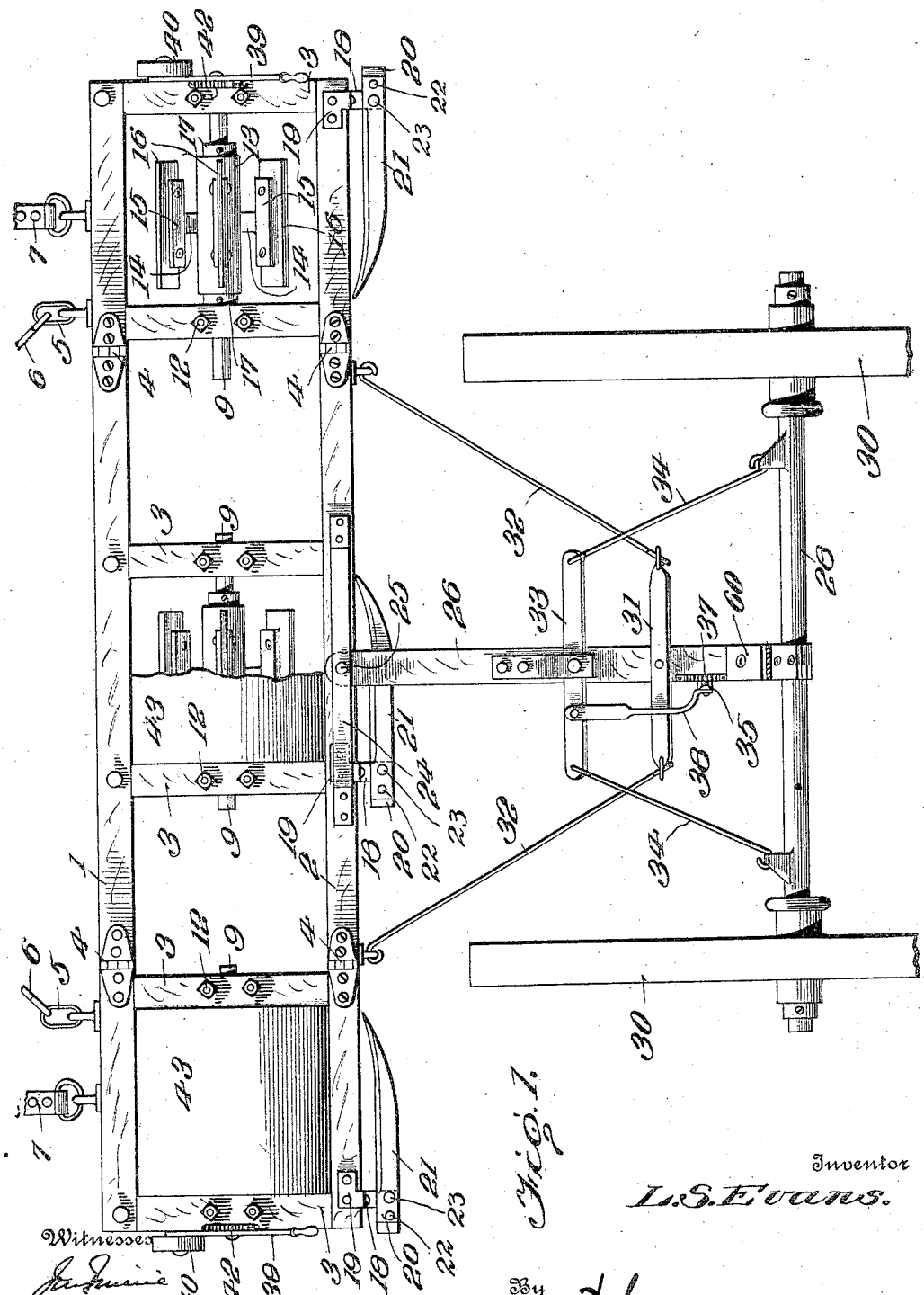

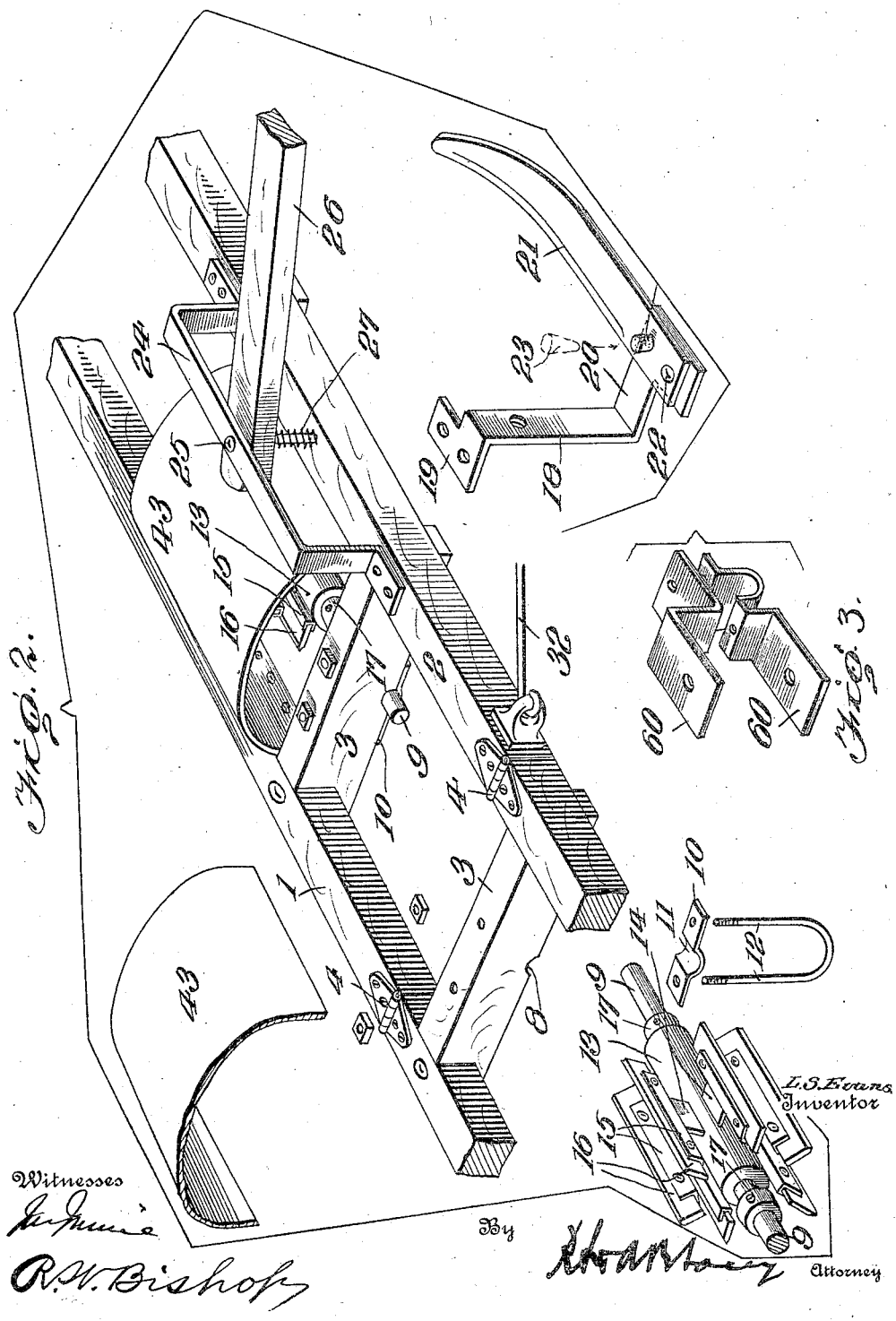

LUCIUS S. EVANS, OF BALLINGER, TEXAS.

AGRICULTURAL MACHINE.

1,182,155. Specification of Letters Patent. Patented May 9, 1916.

Application filed September 15, 1914. Serial No. 861,835.

*To all whom it may concern:*

Be it known that I, LUCIUS SANFORD EVANS, citizen of the United States, residing at Ballinger, in the county of Runnels and State of Texas, have invented certain new and useful Improvements in Agricultural Machines, of which the following is a specification.

This invention aims to provide, in an agricultural machine, a rotary cutter and a fixed horizontal cutter which coöperate in a novel manner, and to provide novel means for mounting the horizontal cutter yieldingly.

In the drawings:—Figure 1 is a plan view, partly broken away, of my improved machine; Fig. 2 is a perspective view of the frame and a rotary cutter, showing the parts separated but in their approximately relative positions; Fig. 3 is a detail perspective view of the parts of the clamp separated but approximately in their proper relative positions.

In carrying out my invention, I employ a frame consisting of front and rear beams 1 and 2, which are connected at intervals by shorter beams or bars 3, the beams 1 and 2 being arranged parallel and the bars 3 being rigidly secured to the said beams in any desired manner. As shown most clearly in Fig. 1, six bars 3 are provided, and the said bars are arranged in pairs so that cutters carried by the several pairs of bars will act simultaneously upon three rows of plants as the machine is drawn over the field. The front and rear beams are preferably divided, and the members thus formed are connected by hinges 4 so that, as the machine is drawn over the field, the several sections or members may readily accommodate themselves to any unevenness or irregularity in the surface of the ground.

The front beam 1 carries clevises 5 to which pulling rods 6 are attached, said rods having their front ends connected in any desired manner to the draft animals. When it is desired to connect the device to a drag harrow, I remove the rods 6 and provide straps 7 which have their rear ends attached to the front beam 1 and their front ends secured to the rear bar of the drag harrow whereby the machine will be drawn positively over the field directly in rear of the drag harrow.

In the lower edges or sides of the bars 3, I provide recesses or notches 8 which receive the ends of shafts 9. A bearing plate 10 is secured rigidly to the under side of each bar 3 to support the said shaft, the said plate having a seat 11 formed therein to constitute a bearing for the shaft, and a clip or U-bolt 12 being inserted upwardly through the ends of the said plate and the bar and secured rigidly in the bar so as to firmly support the shaft. It will thus be seen that the shafts are rigidly secured to the bars and the rotary cutters are mounted loosely upon the shafts. The rotary cutters each consist of a sleeve or hub 13 encircling the shaft and having spokes 14 formed integral therewith, the outer ends of the spokes being laterally extended so as to provide heads 15 which are grooved in their outer edges to receive the cutter blades 16, as shown. The blades are bolted or otherwise rigidly secured in the heads, and it will be readily understood that as a blade is worn it may be easily removed and a fresh blade substituted therefor. It will also be noted that, if all the blades be removed, the heads or outer ends of the spokes will serve as clod crushers to break up any lumps of dirt which may lie along the row so that the machine may be used to quickly reduce the soil to a proper condition for the planting of a new crop. The rotary cutters or the hubs thereof are held against longitudinal movement upon the respective shafts by collars 17 which are secured upon the shafts adjacent the ends of the hubs by set-screws or equivalent devices, and this arrangement permits me to space the cutters so that they will travel properly along the rows.

To the rear beam 2, I secure a series of brackets 18 having a central depending portion or standard, at the upper end of which is a laterally turned lip or plate 19 which is adapted to rest upon the beam 2 and through which suitable screws or bolts may be passed to secure the bracket to the beam. At the lower end of the standard or intermediate portion of the bracket is a rearwardly projecting plate or lip 20, upon which a stubble blade or cutter 21 is carried.

As shown most clearly in Fig. 2, the stubble blade or cutter 21 is attached to the bracket by two pins, one pin 22 being of metal and permanent so as to constitute a pivotal connection between the blade and the plate, while the other pin 23 is of wood or some other easily fractured material so that, if the cutter in its travel strikes a rock or other non-yielding obstruction, the said pin will break and permit the cutter to swing around the obstruction without being damaged. The operator will, of course, keep a supply of these frangible pins on hand so that, when one is broken, he may immediately restore the blade to its working position and insert a new pin.

The bracket 18 should be of such height that it will extend from the frame close to the ground, and the cutter should extend from the bracket across the path of the rotary cutter and directly in rear of the same so that the stubble left by the rotary cutter may be cut off close to or flush with the ground. As shown most clearly in Fig. 1, the forward or cutting edge of the blade 21 is curved at its free end toward the frame of the machine so that the stems against which the blade moves will not be turned aside and permitted to clear the end of the blade, but will be positively cut off.

Upon the rear beam 2 at the center of the same, I secure a bracket or loop 24 through the arch of which a pivot pin or bolt 25 is inserted into the rear beam. A tongue 26 has its front end loosely mounted upon the said pin or bolt, and a spring 27 is coiled around the bolt or pin below the said tongue and serves to cushion the front end of the tongue as the machine is drawn over the field. The rear end of the tongue 26 is pivoted between the clamp members 60 so as to have lateral movement. The said clamp members are shaped to fit around and are securely fastened to an axle 28 of the riding attachment. Ground wheels 30 are loosely mounted upon the ends of the axle, as shown and as will be readily understood.

Pivoted upon the tongue in advance of the axle is a cross bar 31 to the ends of which are loosely attached the rear ends of guy rods 32 having their front ends pivotally or loosely attached to the rear beam 2. A second cross bar 33 is pivotally mounted upon the tongue in advance of the cross bar 31, and this cross bar 33 is connected by links 34 with the axle 28, as shown most clearly in Fig. 1. A lever 35 is fulcrumed upon the tongue 26 and is adapted to engage a rack or segment 37 upon the tongue whereby the lever may be held in said position. The lever is connected by a rod or link 38 with the cross bar 33, and it will be readily understood that by swinging the lever backward or forward the said cross bar will be moved about its pivotal connection with the tongue and, consequently, the axle 28 swung to one or the other side of the line of travel so that the axle and the ground wheels 30 may follow the movement of the drag harrow and the cutter frame in making a turn without the wheels coming into contact with the frame or being jerked around by the team and thereby tending to unseat the driver. When the lever is set in central position, the axle will be held parallel with the frame of the stalk cutter and, consequently, the wheels 30 will follow directly behind the said frame without tending to move to either side.

By connecting the riding attachment with the frame in the manner shown and described, the necessary independent movement of the parts in turning is permitted, while the riding attachment will be held positively in direct line with the cutter frame when moving along the rows. It will also be noted that the ground wheels of the riding attachment are so spaced as to come between the rows. In order that the frame of the riding attachment may be held above the ground so that the cutters will not operate when the machine is being drawn along a road, or from one field to another, I provide at each end of the frame a lever 39 which carries a roller or wheel 40 at its lower end. The lever 39 may be equipped with any common latch device (not shown) adapted to engage a segment or holding rack 42 on the frame. Upon the frame over each rotary cutter I provide a hood 43 so that the operator, or other persons who may be near the machine while it is in use, will be protected against injury by contact with the rotary cutters.

It is thought that the use and advantages of my improved machine will be readily understood from the foregoing description, taken in connection with the accompanying drawings. The machine is drawn over the ground in rear of a drag harrow which will clear the standing stalks of all stems or burs, and the rotary cutters will break down the stalks and cut them into short pieces. The short stubble left projecting above the ground will be cut off at the surface of the ground by the stubble cutters which are caused to travel in the rear of the rotary cutters.

Having thus described the invention, what is claimed as new is:—

In a machine of the class described, a frame; a rotary cutter journaled in the frame and constituting a support for the frame; a bracket depending from the rear of the frame; a substantially horizontal blade constituting a means for limiting the tilting of the frame on the rotary cutter; a pivot element uniting the blade with the bracket; and a frangible pin uniting the blade with the bracket, the frangible pin permitting the blade to swing on the pivot element when the rotary cutter sinks unduly into the ground and creates an undue draft on the blade.

In testimony whereof I affix my signature in presence of two witnesses.

LUCIUS S. EVANS. [L. S.]

Witnesses:
PAUL TRIMMIER,
C. W. NORTHINGTON.

Copies of this patent may be obtained for five cents each, by addressing the "Commissioner of Patents, Washington, D. C."